United States Patent
Pezeshk et al.

(10) Patent No.: US 9,318,145 B2
(45) Date of Patent: Apr. 19, 2016

(54) METHOD FOR DECODING UNDER OPTICAL AND ELECTRONIC NOISE

(75) Inventors: Aria Pezeshk, State College, PA (US); John Anderson Fergus Ross, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 1257 days.

(21) Appl. No.: 12/414,263

(22) Filed: Mar. 30, 2009

(65) Prior Publication Data

US 2010/0246686 A1 Sep. 30, 2010

(51) Int. Cl.
*G11B 20/24* (2006.01)
*G11B 20/10* (2006.01)
*G11B 20/18* (2006.01)
*G11B 20/14* (2006.01)

(52) U.S. Cl.
CPC ........ *G11B 20/10009* (2013.01); *G11B 20/105* (2013.01); *G11B 20/10277* (2013.01); *G11B 20/18* (2013.01); *G11B 20/24* (2013.01); *G11B 2020/1453* (2013.01); *G11B 2220/2504* (2013.01); *G11B 2220/2537* (2013.01)

(58) Field of Classification Search
CPC ............. G11B 201/10379; G11B 2020/10787; G11B 20/24; G11B 20/10009; G11B 20/10277; G11B 20/105; G11B 20/18; G11B 2220/2537; G11B 2020/1453; G11B 2220/2504
USPC ............. 369/59.21, 59.22, 47.18, 59.23, 103, 369/106, 107; 375/240.25; 714/786, 792, 714/794, 769, 795
See application file for complete search history.

(56) References Cited

U.S. PATENT DOCUMENTS

| | | | | |
|---|---|---|---|---|
| 5,220,568 A | * | 6/1993 | Howe | H03M 5/145 341/59 |
| 6,373,413 B1 | * | 4/2002 | Yoshinaka | G11B 20/10 341/94 |
| 6,405,341 B1 | * | 6/2002 | Maru | H03M 13/01 375/262 |
| 6,891,483 B2 | | 5/2005 | Noda et al. | |

(Continued)

FOREIGN PATENT DOCUMENTS

| WO | WO2007072277 | 6/2007 |
|---|---|---|
| WO | WO2008078234 | 3/2008 |

OTHER PUBLICATIONS

Bahl et al.; Optimal Decoding of Linear Codes for Minimizing Symbol Error Rate; IEEE Transactions on Information Theory, Mar. 1974; pp. 284-287.

(Continued)

*Primary Examiner* — Thomas Alunkal
(74) *Attorney, Agent, or Firm* — Jean K. Testa; Fletcher Yoder, P.C.

(57) ABSTRACT

The present techniques provide systems and methods for decoding an optical data signal in an optical system to retrieve source information while decreasing errors resulting from optical and electronic noise in the optical system. The techniques involve using decoding algorithms to estimate the a posteriori state probabilities and the a posteriori transition probabilities of the data encoding, and estimating bit state probabilities. The probability density function used to estimate bit states is parameterized by the expected optical and electronic noise in the optical system. Different optical and electronic noise variances, or different probability densities, may be stored in registers or look-up tables to be accessed by a decoder while decoding the optical data signal.

23 Claims, 6 Drawing Sheets

(56) References Cited

U.S. PATENT DOCUMENTS

| | | | |
|---|---|---|---|
| 6,996,764 B2* | 2/2006 | Yamada | H03M 5/145 714/755 |
| 7,336,207 B2 | 2/2008 | Nakagawa | |
| 7,388,525 B2 | 6/2008 | Miyauchi et al. | |
| 7,403,138 B2 | 7/2008 | Coene | |
| 7,747,177 B2* | 6/2010 | Chen | H04B 10/6165 398/204 |
| 8,095,342 B2* | 1/2012 | Grigoryan | G06F 17/504 703/2 |
| 2003/0115028 A1* | 6/2003 | Summerfield | H04B 10/07 703/6 |
| 2005/0154955 A1* | 7/2005 | Cai | H03M 13/45 714/746 |
| 2008/0122667 A1 | 5/2008 | Bentvelsen et al. | |
| 2008/0260985 A1* | 10/2008 | Shirai | G11B 7/24038 428/64.5 |
| 2009/0016469 A1* | 1/2009 | Li | H03M 13/3707 375/341 |
| 2009/0092208 A1* | 4/2009 | Montekyo | H04L 1/205 375/346 |
| 2010/0074342 A1* | 3/2010 | Shental | G06F 17/12 375/259 |

OTHER PUBLICATIONS

Miyauchi et al.; Soft-Output Decoding of 17 Parity Preserve/Prohibit Repeated Minimum Transition Runlength (PP) Code; Japanese Journal of Applied Physics; vol. 43, No. 7B, 2004, pp. 4882-4883.

Miyauchi et al.; Application of Turbo Codes to High-Density Optical Disc Storage Using 17PP Code; Japanese Journal of Applied Physics; vol. 44, No. 5B, 2005, pp. 3471-3473.

Application of John Anderson Fergus Ross et al.; entitled "Bit Probability Estimation Method for Noisy Modulation Code"; filed Mar. 30, 2009.

Application of John Anderson Fergus Ross et al.; entitled "Joint DC Minimization and Bit Detection"; filed Mar. 30, 2009.

* cited by examiner

METHOD FOR DECODING UNDER OPTICAL AND ELECTRONIC NOISE

BACKGROUND

The present techniques relate generally to bit-wise optical data storage techniques. More specifically, the techniques relate to methods and systems for decoding data from optical storage systems.

As computing power has advanced, computing technology has entered new application areas, such as consumer video, data archiving, document storage, imaging, and movie production, among others. These applications have provided a continuing push to develop data storage techniques that have increased storage capacity. Further, increases in storage capacity have both enabled and promoted the development of technologies that have gone far beyond the initial expectations of the developers, such as gaming, among others.

The progressively higher storage capacities for optical storage systems provide a good example of the developments in data storage technologies. The compact disc, or CD, format, developed in the early 1980s, has a capacity of around 650-700 MB of data, or around 74-80 min. of a two channel audio program. In comparison, the digital versatile disc (DVD) format, developed in the early 1990s, has a capacity of around 4.7 GB (single layer) or 8.5 GB (dual layer). The higher storage capacity of the DVD is sufficient to store full-length feature films at older video resolutions (for example, PAL at about 720 (h)×576 (v) pixels, or NTSC at about 720 (h)×480 (v) pixels).

However, as higher resolution video formats, such as high-definition television (HDTV) (at about 1920 (h)×1080 (v) pixels for 1080p), have become popular, storage formats capable of holding full-length feature films recorded at these resolutions have become desirable. This has prompted the development of high-capacity recording formats, such as the Blu-ray Disk™ format, which is capable of holding about 25 GB in a single-layer disc, or 50 GB in a dual-layer disc. As resolution of video displays, and other technologies, continue to develop, storage media with ever-higher capacities will become more important.

One developing storage technology that may better achieve future capacity requirements in the storage industry is based on holographic storage. Holographic storage is the storage of data in the form of holograms, which are images of three dimensional interference patterns created by the intersection of two beams of light in a photosensitive storage medium. In bit-wise holography or micro-holographic data storage, every bit may be written as a micro-hologram, or Bragg reflection grating, typically generated by two counter-propagating focused recording beams. The writing process may also involve encoding the data. For example, error correcting codes or modulation codes may be used to encode the data as it is stored in an optical disc. The data is then retrieved by using a read beam to reflect off the micro-hologram to reconstruct the recording beam, and typically involves decoding the data to retrieve the information originally stored.

Although holographic storage systems may provide much higher storage capacities than prior optical systems, as is the case for all optical storage media, they may be vulnerable to interferences. For example, interferences may result from the closely spaced bits in adjacent tracks and layers, or electronic interferences produced by the optical storage system. Decoding techniques which reduce the errors resulting from optical and electronic noise may be advantageous.

BRIEF DESCRIPTION

A contemplated embodiment of the present techniques provides a method of decoding an optical data signal. The method involves receiving an optical data signal and decoding the optical data signal to retrieve source data. Decoding the optical data signal includes estimating source data based on an estimated distribution parameterized by expected optical noise and expected electronic noise in an optical system.

Another contemplated embodiment provides a system for decoding an optical signal. The system includes a detector, a decoder, and a memory component accessible to the decoder. The detector is configured to detect optical returns from an optical data disc, and the decoder is configured to estimate source information from the optical returns to produce a decoded signal. The memory component includes algorithms to estimate the source information from the optical returns, and a look-up table of the probability distribution based on expected optical and expected electronic noise in the system.

DRAWINGS

These and other features, aspects, and advantages of the present invention will become better understood when the following detailed description is read with reference to the accompanying drawings in which like characters represent like parts throughout the drawings, wherein.

Figure 6:
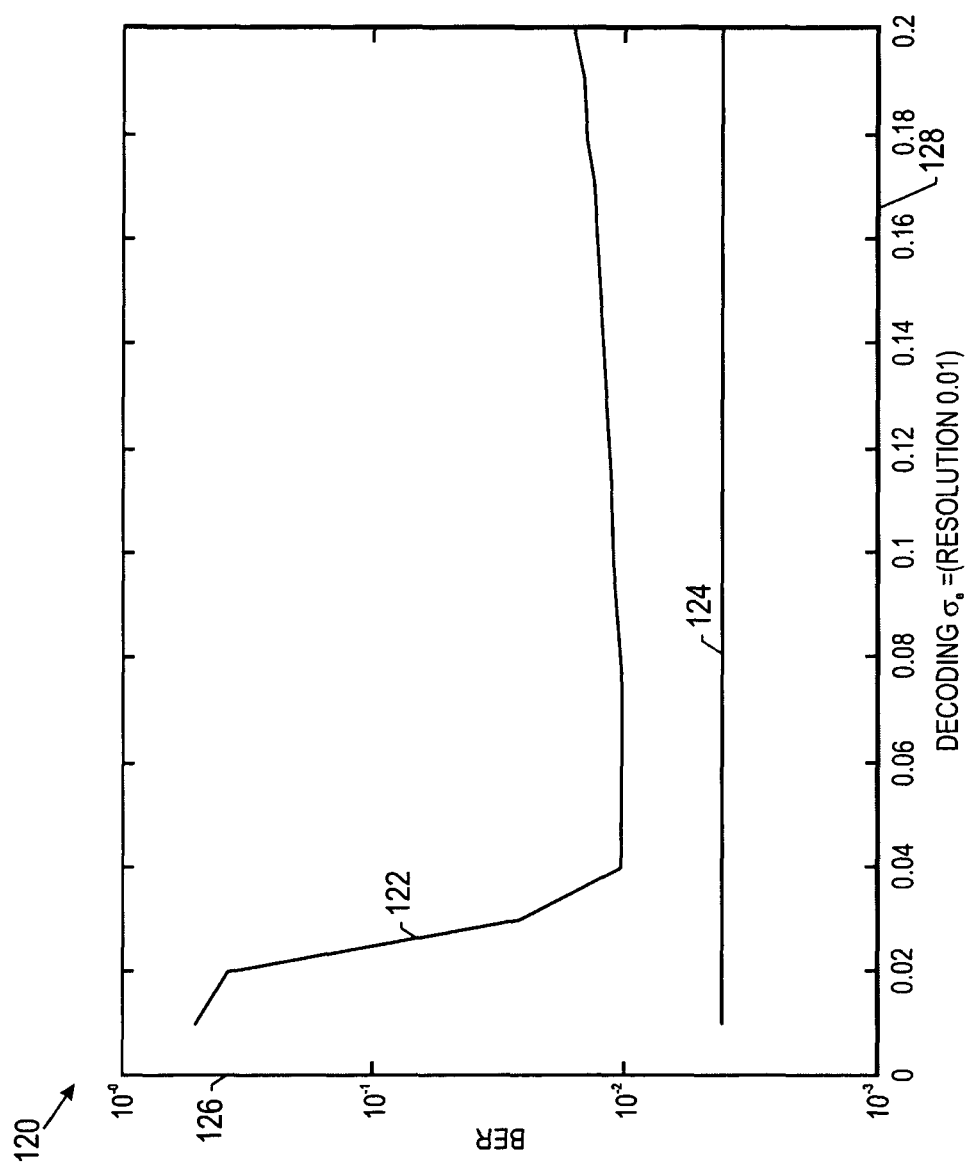
Figure 7:
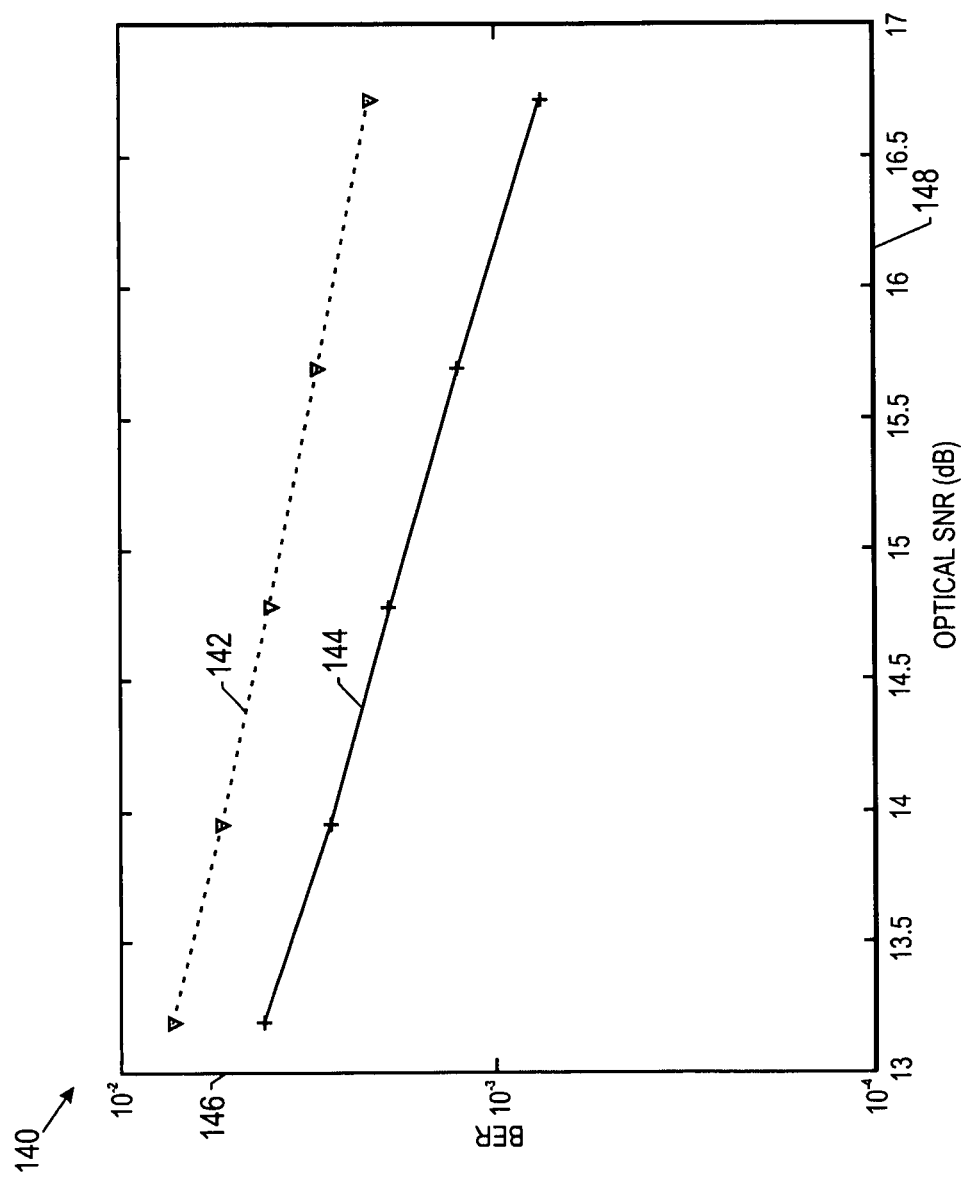

FIG. 6 is a graph comparing the bit error rates of a decoding performance assuming white Gaussian noise and a decoding performance assuming the total noise is represented by the convolution of a Gaussian density function with a modified Rice an density function, over a range of electronic noise variances, in accordance with embodiments of the present techniques; and FIG. 7 is a graph comparing the bit error rates of a decoding performance using threshold detection and a decoding performance using a 16-state MAP decoder over a range of optical noise, in accordance with embodiments of the present techniques.

DETAILED DESCRIPTION

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

The present techniques disclose systems and methods of decoding an optical signal under electrical and optical noise.

In recording, transmitting, retrieving, and/or decoding an optical signal, interferences may decrease the accuracy in estimating source data from the retrieved data. For example, when recording and retrieving data from an optical storage medium, interferences may result from closely spaced data bits in the optical storage medium, or from the electronics involved in recording and retrieving the data. In one embodiment, interferences resulting from known sources or conditions may be addressed in the decoding of retrieved data. In the algorithms used to decode data, a noise distribution may be used to reduce the impact of noise on the decoded signal. However, different optical and electrical conditions in an optical system may result in different levels of noise in an output signal. In embodiments of the present techniques, modified noise distributions based on different noise variances may be used in decoding algorithms to address the different optical and electrical conditions in an optical system.

The decoding techniques discussed herein may apply to any optical system, including optical storage systems, and optical communications systems. For example, optical storage systems may involve recording, retrieving, and decoding data from optical media such as optical or holographic storage discs. Optical communications systems may involve transmitting an optical signal through, for example, a fiber, through water, or through free space. While embodiments in this disclosure may use optical storage systems, and more particularly, holographic storage systems, as an example to explain the present techniques, the present techniques are not limited to optical storage systems, or any particular type of optical storage system. Further, while certain algorithms and trellis relationships may be used as examples for decoders and methods of decoding used in accordance with the present techniques, any decoding algorithm or trellis representation may apply in the decoding techniques of the present disclosure.

Figure 1:
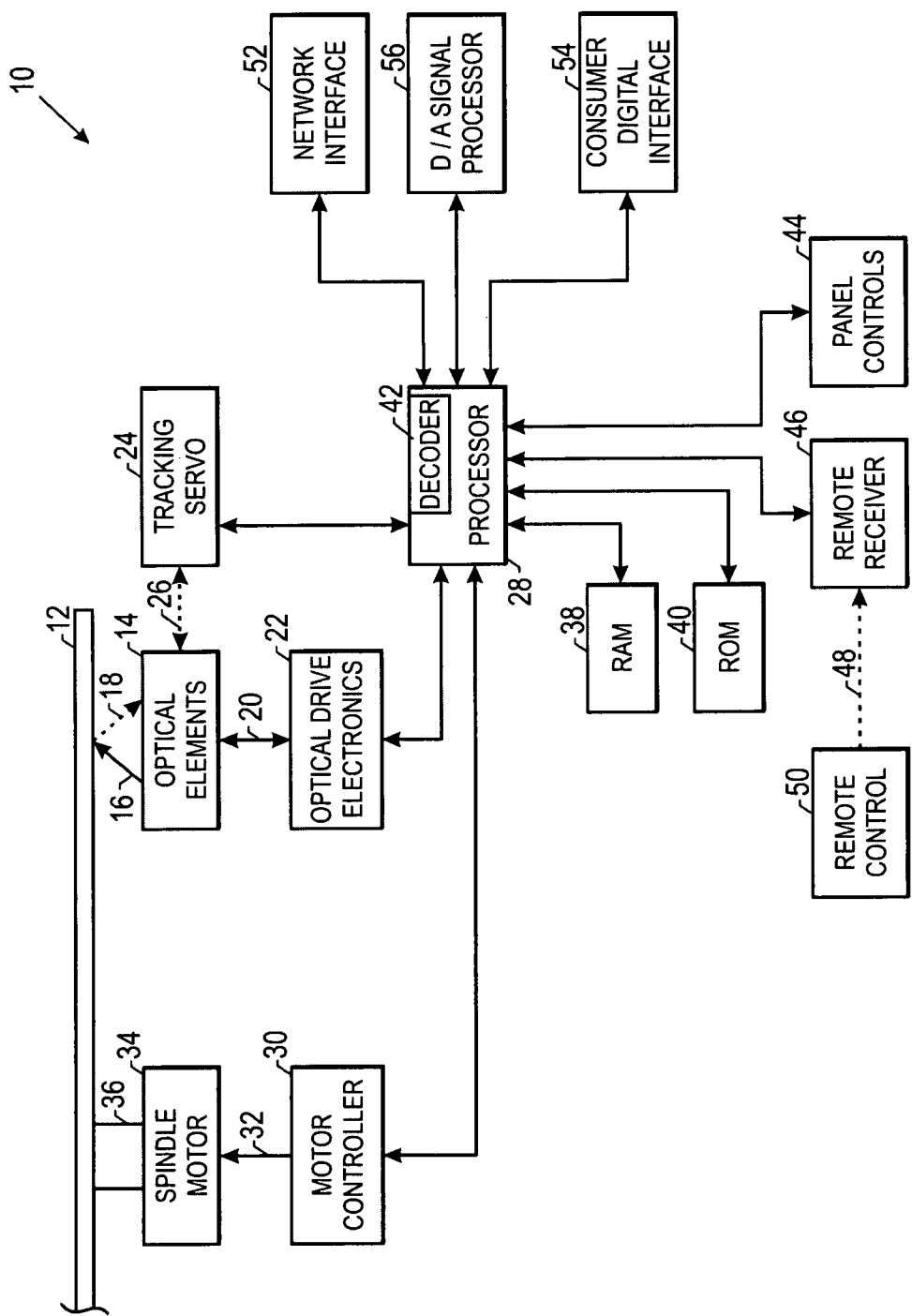
FIG. 1 is a block diagram of an optical disk reader, in accordance with an embodiment of the present techniques.

An optical reader system 10 that may be used to read data from optical storage discs 12 is depicted in FIG. 1. The optical reader system 10 may be a part of an optical storage system, which may include additional elements involved in writing or recording data. In an optical reader system 10, the data stored on the optical data disc 12 is read by a series of optical elements 14, which project a read beam 16 onto the optical data disc 12. A reflected beam 18 is picked up from the optical data disc 12 by the optical elements 14. The optical elements 14 may comprise any number of different elements designed to generate excitation beams, focus those beams on the optical data disc 12, and detect the reflection 18 coming back from the optical data disc 12. The optical elements 14 are controlled through a coupling 20 to an optical drive electronics package 22. The optical drive electronics package 22 may include such units as power supplies for one or more laser systems, detection electronics to detect an electronic signal from the detector, analog-to-digital converters to convert the detected signal into a digital signal, and other units such as a bit predictor to predict when the detector signal is actually registering a bit value stored on the optical data disc 12.

The location of the optical elements 14 over the optical data disc 12 is controlled by a tracking servo 24 which has a mechanical actuator 26 configured to move the optical elements back and forth over the surface of the optical data disc 12. The optical drive electronics 22 and the tracking servo 24 may be controlled by a processor 28 or may be controlled by dedicated servo electronics. The processor 28 also controls a motor controller 30 which provides the power 32 to a spindle motor 34. The spindle motor 34 is coupled to a spindle 36 that controls the rotational speed of the optical data disc 12. As the optical elements 14 are moved from the outside edge of the optical data disc 12 closer to the spindle 36, the rotational speed of the optical data disc may be increased by the processor 28. This may be performed to keep the data rate of the data from the optical data disc 12 essentially the same when the optical elements 14 are at the outer edge as when the optical elements are at the inner edge. The maximum rotational speed of the disc may be about 500 revolutions per minute (rpm), 1000 rpm, 1500 rpm, 3000 rpm, 5000 rpm, 10,000 rpm, or higher.

The processor 28 is connected to random access memory or RAM 38 and read only memory or ROM 40. The ROM 40 contains the programs that allow the processor 28 to control the tracking servo 24, optical drive electronics 22, and motor controller 30. Further, the ROM 40 also contains programs that allow the processor 28 to analyze data from the optical drive electronics 22, which has been stored in the RAM 38, among others. As discussed in further detail herein, such analysis of the data stored in the RAM 38 may include, for example, demodulation, decoding or other functions necessary to convert the information from the optical data disc 12 into a data stream that may be used by other units. The demodulation and decoding, or any other analysis or conversion of data, may be performed by a decoder 42 in the processor 28 or in some other component of the optical reader system 10. Algorithms or data used in demodulation or decoding may be stored in the RAM 38 or the ROM 40, or any other memory component accessible to the processor 28 or the decoder 42.

If the optical reader system 10 is a commercial unit, such as a consumer electronic device, it may have controls to allow the processor 28 to be accessed and controlled by a user. Such controls may take the form of panel controls 44, such as keyboards, program selection switches and the like. Further, control of the processor 28 may be performed by a remote receiver 46. The remote receiver 46 may be configured to receive a control signal 48 from a remote control 50. The control signal 48 may take the form of an infrared beam, or a radio signal, among others.

After the processor 28 has analyzed the data stored in the RAM 38 to generate a data stream, the data stream may be provided by the processor 28 to other units. For example, the data may be provided as a digital data stream through a network interface 52 to external digital units, such as computers or other devices located on an external network. Alternatively, the processor 28 may provide the digital data stream to a consumer electronics digital interface 54, such as a high-definition multi-media interface (HDMI), or other high-speed interfaces, such as a USB port, among others. The processor 28 may also have other connected interface units such as a digital-to-analog signal processor 56. The digital-to-analog signal processor 56 may allow the processor 28 to provide an analog signal for output to other types of devices, such as to an analog input signal on a television or to an audio signal input to an amplification system.

Figure 2:
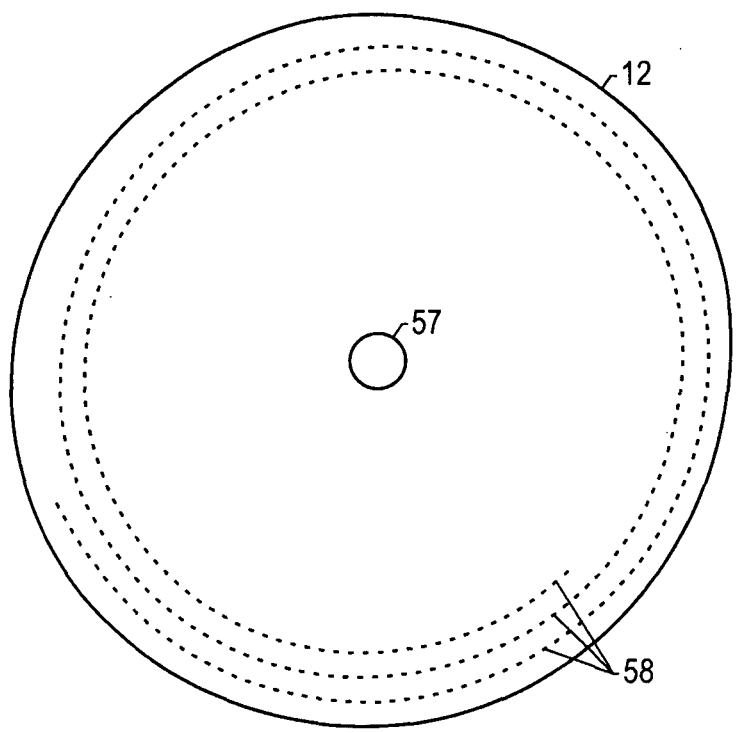
FIG. 2 illustrates an optical disk having data tracks, in accordance with embodiments of the present techniques.

The reader 10 may be used to read an optical data disc 12 containing data, as shown in FIG. 2. Generally, the optical data disc 12 is a flat, round disc with one or more data storage layers embedded in a transparent protective coating. The protective coating may be a transparent plastic, such as polycarbonate, polyacrylate, and the like. The data layers may include any number of surfaces that may reflect light, such as the micro-holograms used for bit-wise holographic data storage. The disc 12 may also include a reflective surface with pits and lands. A spindle hole 57 couples to the spindle to control the rotation speed of the disc 12. The data may be generally written in a sequential spiraling track 58 from the outer edge of the disc 12 to an inner limit, although individual concentric circular data tracks, or other configurations, may be used.

Figure 3:
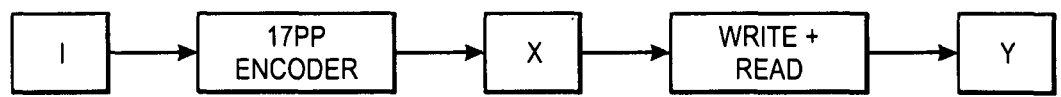
FIG. 3 is a flow chart of an overview of a method for encoding source information and writing and reading encoded output symbols, in accordance with embodiments of the present techniques.

Writing data in an optical storage system typically involves encoding the data into a form that is recordable on an optical disc 12. In some embodiments, source data may be in the form of bits, and may be encoded as output symbols on the optical disc 12. An overview of how encoding and decoding of data may fit in an optical storage system is presented in the block diagram of FIG. 3. In storing source information, depicted as I, onto an optical storage disc 12, the source information I may first be converted into a format which may be stored on the disc 12. For example, source information I may be in the form of an electronic or digital signal, and may be encoded by a 17pp encoder to form an encoded output X. The encoded output X is then modulated and stored onto/into the disk. After reading, output symbols Y is detected and used to estimate the original source information I.

An optical reader system 10 may retrieve the original information I by reading the disc 12. As the original information I had been encoded for storage on the disc 12, the reader 10 may read the information as output symbols Y, which must be decoded and/or demodulated to retrieve the original information vector I. The difference between encoded output X and the symbol outputs term Y may refer to the fact that the processes of writing and reading the 17pp encoded output X may result in interferences and distortions from the media, optics, and the electronics of an optical storage system, such that the received output symbols Y may include noise in addition to the originally encoded outputs X. Such interferences may decrease the accuracy of estimating information I from the output symbols Y, and embodiments of the present technique may effectively convert symbol outputs to retrieve original information I, while reducing errors resulting from optical and electronic noise to improve the estimation of the original source information I.

In one embodiment, the encoding, writing, and reading process may be comparable to a Markov chain, where future states of an output may depend probabilistically on a present state, and independent of past states. A recursive algorithm may be used to compute the a posteriori probabilities of the states and transitions of a Markov chain, given detected data Y. For example, such a recursive algorithm is presented by Bahl, Cocke, Jelinek, and Raviv, in the article "Optimal Decoding of Linear Codes for Minimizing Symbol Error Rate," found on pages 284-287 in the March 1974 IEEE Transactions on Information Theory, and may be referred to as the "BCJR algorithm."

One embodiment of the present techniques may incorporate the BCJR algorithm to estimate bit probabilities. However, the present techniques are not limited to any particular decoding scheme. For example, another embodiment, a decoder 42 may use other bit likelihood estimators, such as enhance Viterbi algorithms. To give an example of a decoding scheme used in the present techniques, the BCJR algorithm will be discussed in the equations and explanations below.

One embodiment of the present techniques involves estimating the original information I from the output symbols Y read from the optical disc 12. In some embodiments, the decoder 42 may be a maximum a posteriori (MAP) decoder, which may be used to decode the output symbols Y and estimate the original information I. The a posteriori probabilities of the states and transitions of the encoded data X may be represented in equations (1)-(2) below:

$$Pr\{S_t = m \mid Y_1^\tau\} = Pr\{S_t = m; Y_1^\tau\}/Pr\{Y_1^\tau\} \quad \text{equation (1)}$$
$$= \lambda_t(m)/Pr\{Y_1^\tau\}$$

$$Pr\{S_{t-1} = m'; S_t = m \mid Y_1^\tau\} = Pr\{S_{t-1} = m'; S_tm; Y_1^\tau\}/ \quad \text{equation (2)}$$
$$Pr\{Y_1^\tau\}$$
$$= \sigma_t(m', m)/Pr\{Y_1^\tau\}$$

In the above equation, $Pr\{S_t=m; Y_1^\tau\}$ represents the probability that the (trellis or state representation of the) encoded data is in state m at time t, given the detected data Y, and $Pr\{S_{t-1}=m'; S_t=m; Y_1^\tau\}$ represents the probability that the encoded data transitions from state m' at time t−1 to state m at time t, given Y. The different states are denoted by m, and bits may transition from state m' to state m. The state and transition probabilities may be computed from the alpha, beta, and gamma functions, as defined by the BCJR algorithm:

$$\alpha_t(m) = Pr\{S_t=m; Y_1^t\} \quad \text{equation (3)}$$

$$\beta_t(m) = Pr\{Y_{t+1}^\tau \mid S_t=m\} \quad \text{equation (4)}$$

$$\lambda_t(m) = \alpha_t(m) \cdot \beta_t(m) \quad \text{equation (5)}$$

Referring back to equation (2), $\sigma_t(m', m)$ may represent the a posteriori transition probabilities of trellis states, and may be computed with the alpha, beta, and gamma functions, $$\sigma_t(m',m) = \alpha_{t-1}(m') \cdot \gamma_t(m',m) \cdot \beta_t(m), \quad \text{equation (6)}$$

where $$\gamma_t(m',m) = Pr\{S_t=m; Y_t \mid S_{t-1}=m'\}. \quad \text{equation (7)}$$

To compute the alpha, beta, and gamma functions, the following recursions may be used:

$$\alpha_t(m) = \sum_{m'} \alpha_{t-1}(m') \cdot \gamma_t(m', m) \quad \text{equation (8)}$$

$$\beta_t(m) = \sum_{m'} \beta_{t+1}(m') \cdot \gamma_{t+1}(m, m') \quad \text{equation (9)}$$

$$\gamma_t(m', m) = \sum_{X} p_t(m \mid m') \cdot q_t(X \mid m', m) \cdot R(Y_t, X) \quad \text{equation (10)}$$

In the gamma function of equation (10), $p_t(m|m')$ are the Markov transition probabilities, and $q_t(X|m',m)$ is the probability of an output symbol X for given state transition m' to m. Bit probability estimates are computed using the a posteriori transition probabilities $\sigma_t(m',m)$, and the a posteriori probability estimate for a bit may be obtained by summing all of the a posteriori transition probabilities corresponding to that same input bit. For example, a bit may have a "0" state or a "1" state, and the two a posteriori estimates may be represented by $APP_t(0)$ and $APP_t(1)$:

$$APP_t(b) = Pr\{I_t = b \mid Y_1^\tau\} \quad \text{equation (11)}$$

$$= \sum_{X_b} \sigma_t(m', m)$$

If the probability of a bit having a 0 state, or $APP_t(0)$, is higher than the probability of a bit having a 1 state, $APP_t(1)$, then the decoder 42 may estimate that the bit b has a 0 state rather than a 1 state. The summation in equation (11) occurs over all $\sigma_t(m', m)$ values where the input bit $I_t$ corresponding to the transition $(m',m)$ is b, and $\lfloor X_b \rfloor$ is the corresponding output of the Markov source for the transition $(m',m)$. In some embodiments, a branch may have multiple input and output pairs, and the summation of $\sigma_t(m',m)$ may take place over all combinations of input and output pairs for each branch. To estimate the probability of the state of a bit, all of the $\sigma_t(m', m)$ values of the bit may be summed, and the decoder 42 will determine whether the probability of the bit having a 0 state is higher than the probability of the bit having a 1 state, or vice versa.

The output of the BCJR algorithm is therefore not the source information itself, but rather the probability or likelihood of the state of each bit in the source information. Thus, the output of the BCJR algorithm is referred to as a "soft output." Typically, this soft output is determined by the algorithm using a trellis representation indicating state transitions of the encoding process. The trellis representation of the encoding process, which may be graphically depicted as a trellis diagram, may show the input-to-output relationship of a convolutional operation and the paths of state transitions for each combination of input and output pairs. The trellis diagram may depict different paths from one state to another for each time interval of an encoding process, and a decoder may use the paths of a trellis diagram to determine the encoding process by tracing data state transitions to obtain a soft output.

A trellis representation is typically determined when an input signal is decoded using a convolutional code. However, the data inputs and symbol outputs in some modulation techniques may not have an obvious convolutional relationship. A modulation code such as 17 Parity Preserve/Prohibit (17pp), for example, may enable source data to be modulated as a bit stream, such that at each step of the encoding, a variable number of data bits may be modulated. However, since the input-to-output relationship of the 17pp modulation encoding does not have an obvious convolutional relationship, the lack of an obvious trellis representation may increase the complexity of the demodulating and/or decoding of data, as a decoding algorithm may not be able to trace a trellis diagram to determine input-to-output relationships and determine the most probable state of the input bits originally sent in the source information. A decoding scheme using a trellis structure which duplicates the input-to-output relationship of the 17pp modulation scheme is desirable.

Figure 4:
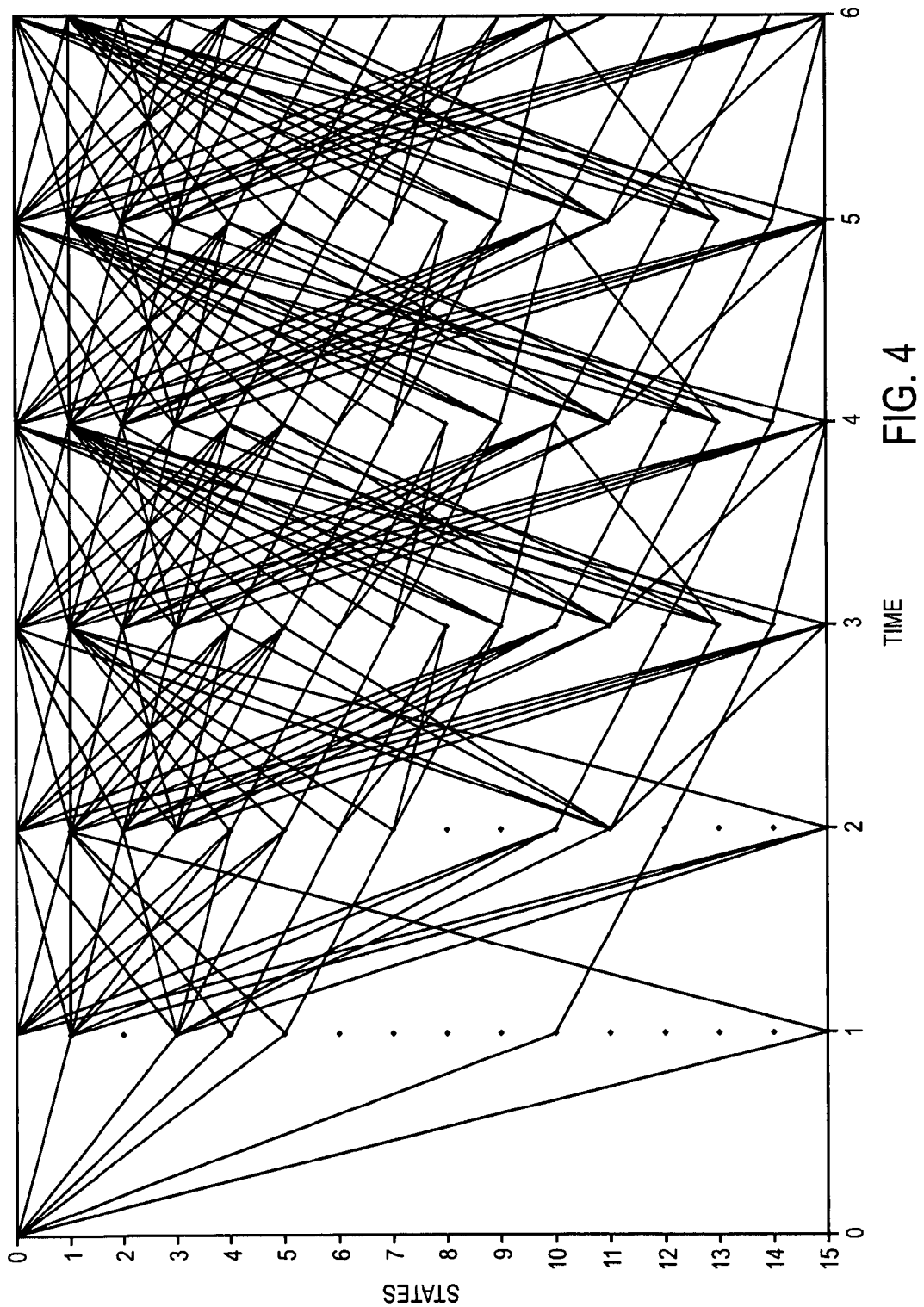
FIG. 4 is a trellis diagram having 16 states, in accordance with embodiments of the present techniques.

Some attempts at creating a trellis diagram to duplicate the 17pp scheme have resulted in a 15 state trellis diagram, as presented in Miyauchi, et al, U.S. Pat. No. 7,388,525B2. An example of a state trellis diagram which may be used in accordance with the present techniques is provided in the 16-state trellis diagram of FIG. 4. The trellis diagram may be a graphical representation of state transitions of input-to-output pairs through an encoding process, and may be used by a decoder of the present techniques to decode data modulated with the 17pp scheme.

Systems and methods of decoding under optical and electrical noise may reduce noise to improve the bit estimation by the decoder 42 in an optical reader system 12. The impact of interferences from electronic or optical noise may be reduced by computing the gamma term of the BCJR algorithm based on known noise parameters in the optical storage system. For example, in some embodiments, a decoder 42 using a 16-state trellis may further improve bit estimation by computing the gamma term of the BCJR algorithm based on noise or interferences which may be present in the optical storage system.

Embodiments of the present techniques may apply to any optical storage system that uses pits and lands for data storage, including DVDs, Blu-Ray™ discs, and the like. Though embodiments of the present techniques are not limited to any particular type of optical storage system, holographic storage systems, including the writing and reading processes of holographic storage systems, will be discussed as an example to explain embodiments of the decoding techniques.

As discussed, some of the noise which may disrupt the estimation of I from Y (as in FIG. 3) may result from writing and reading the encoded output symbols X on the optical disc 12. For example, bit-wise holographic data storage systems typically write a symbol in an optical disc 12 by emitting two constructively interfering laser beams at each site that a micro-hologram is to be formed. The constructive interference of the two beams may, for example, change the refractive index at the point the micro-hologram is formed. Different materials may be used for the storage layer, including for example, photosensitive materials that have a chemical reaction upon irradiation with the crossed beams, or materials that have a physical phase change upon irradiation.

The retrieval of information in a holographic storage system typically involves emitting a laser beam to read data bits, which may be represented by the presence or absence of micro-holograms on a holographic data disc. Each of the micro-holograms acts as a Bragg reflector, which uses an interference pattern to reflect a narrow frequency band of light by constructive and destructive interference. The Bragg reflector may also carry phase information in the interference pattern. An optical reader system determines a bit state by estimating whether a micro-hologram is present at a given bit position. For example, when a micro-hologram is present, the system may determine the bit to be in a 1 state, and when a micro-hologram is absent, the system may determine the bit to be in a 0 state. The bit estimation may generally be based on an optical return of a reading beam reflected from the data bit, which may be received at the detector of the optical reader system 10.

Word errors may result from either the writing or reading of information in a holographic storage system. For example, write errors may occur in storage systems where data bits are closely spaced, and the recording beam causes changes in the photosensitive material of the disc 12 beyond the position of the desired bit. Further, closely spaced data bits may also result in read errors. Though a reading beam may be directed to a particular data bit, micro-holograms that are adjacent to the data bit of interest may also reflect a portion of the reading beam, resulting in interferences which affect the bit state estimation of the data bit of interest. Such interferences may limit the minimum separation between adjacent micro-holograms in holographic storage systems, and may also limit data storage in other optical storage systems that use pits and lands for data storage, including DVDs and Blu-Ray™ discs. Interferences may also arise from the system itself. For example, the electronics in the optical storage system may result in electronic noise, which may also reduce the ability of an optical reader to accurately estimate the original information I, given the output symbols Y read by the detector.

Figure 5:
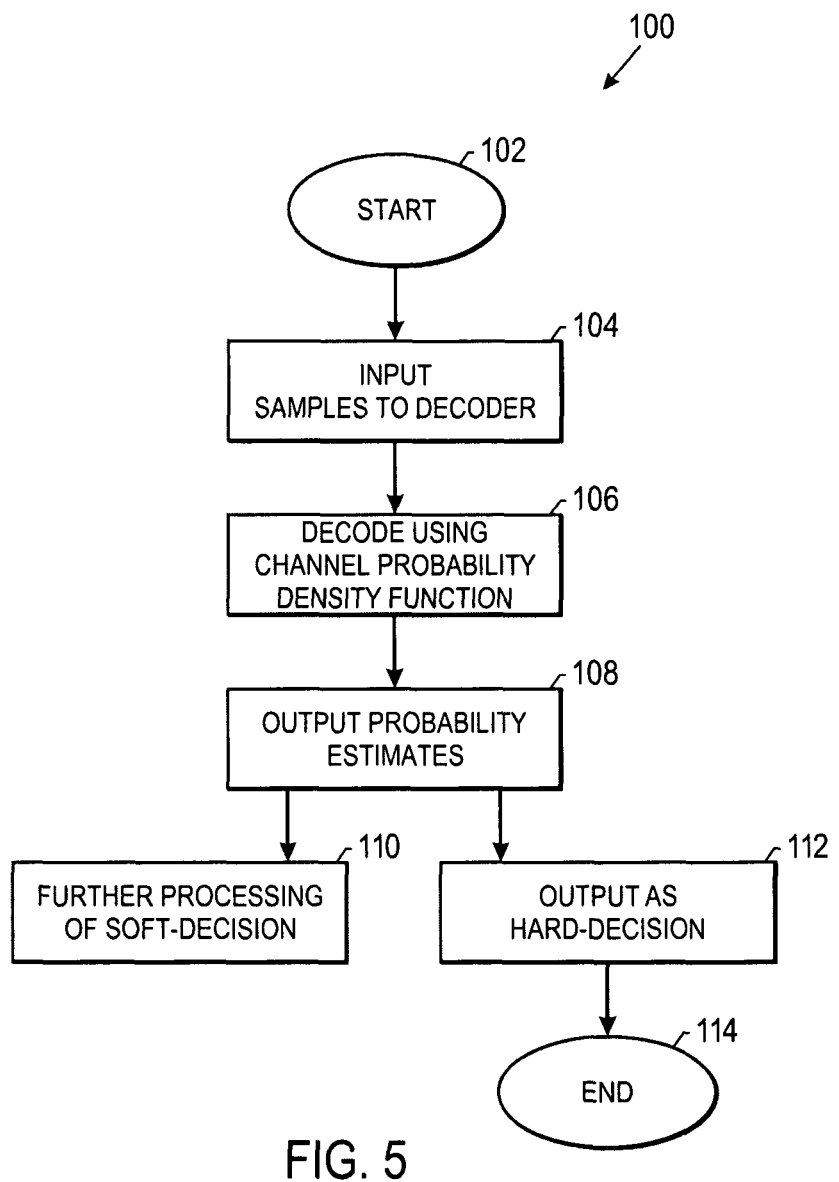
FIG. 5 is a flow chart illustrating steps in the decoding process, in accordance with embodiments of the present techniques.

In some embodiments of the present techniques, a decoder 42 may reduce word errors and improve bit state estimation by parameterizing noise distributions used in the decoding algorithms according to expected optical and electronic noise. The flow chart of FIG. 5 depicts a process 100 for reducing the effects of optical and electronic noise in decoding a signal, in accordance with the present techniques. As discussed, optical and electronic conditions may add noise when recording the input signal $X_1^\tau$, and the output $Y_1^\tau$ may be impacted by this noise. Referring to the equations previously discussed, a memoryless channel may be written as:

$$Pr\{Y_1^t \mid X_1^t\} = \prod_{j=1}^{t} R(Y_j \mid X_j) \quad \text{equation (12)}$$

where the memoryless channel receives an input signal $X_1^\tau$, and may have conditions which add noise, to output $Y_1^\tau$. The transition probabilities between $X_1^\tau$ and $Y_1^\tau$ may be the product of the probability density function $R(Y_j|X_j)$ of the memoryless channel.

The process 100 of decoding while reducing the effects of this noise may start (block 102) when the samples $Y_1^\tau$ are input to a decoder 42 (block 104). In one embodiment, the decoder 42 may reduce the impact of noise found in output symbol $Y_1^\tau$ by decoding the output symbols using the previously discussed algorithms to determine the most probable path through a 16-state trellis. In using the decoding algorithms, the decoder 42 may input values for $R(Y_j|X_j)$, the channel probability density function, which may be computed based on expected optical and electronic noise (block 106). For example, the values can be computed ahead of time and stored in a look-up table. In this embodiment, the lookup table approximates the probability density function and is referred to herein as the probability distribution. Below are examples of equations which may be used to model the noise in a system:

$$p_1(v_1) = \begin{cases} \dfrac{1}{2\sigma_A^2} \exp\left(-\dfrac{v_1 + a^2}{2\sigma_A^2}\right) \cdot I_0\left(\dfrac{a\sqrt{v_1}}{\sigma_A^2}\right); & v_1 \geq 0 \\ 0; & v_1 < 0 \end{cases} \quad \text{equation (13)}$$

$$p_2(v_2) = \dfrac{1}{\sqrt{2\pi}\sigma_e} \exp\left(-\dfrac{v_2^2}{2\sigma_e^2}\right) \quad \text{equation (14)}$$

$$v = v_1 + v_2 \Rightarrow p(v) = p_1(v) * p_2(v) \quad \text{equation (15)}$$
$$= \int_0^\infty p_1(v_1) \cdot p_2(v - v_1) \, dv_1$$

where $v_1$ is proportional to optical intensity, $v_2$ is the electrical noise, $v$ is the final output signal, and $I_0$ is the zeroth order Modified Bessel Function. The signal amplitude (which may be either 0 or 1) is represented by a, and the variance for the real and imaginary parts of the complex noise amplitude added to the readout signal before detection is represented by $\sigma_A^2$. The variance of the additive electrical noise is represented by $\sigma_e^2$. Once the samples $Y_1^\tau$ have been decoded using the channel probability density function, the process 100 may output probability estimates (block 108). In embodiments, the probability estimates may be further processed as soft decisions (block 110), or the estimates may be output as hard decisions (block 112) to a suitable device and end the decoding process 100 (block 114).

Typically, decoding schemes may address noise by assuming only Gaussian noise in computing $R(Y_j|X_j)$ values. One example of such a scheme may be found in Miyauchi's study of decoding 17pp encoded optical data. Toshiyuki Miyauchi, *Application of Turbo Codes to High-Density Optical Disc Storage Using 17PP Code*, 44 Japanese Journal of Applied Physics 3471, 3471-3473 (2005). However, the characteristics of some optical and electrical noise may be more precisely addressed by calculating a final output signal v parameterized by the noise characteristics of the optical storage system. The probability density function of the final output signal v may be obtained by convolving the Gaussian probability density function, typical for electronic noise, with a Ricean or modified Ricean probability density function, due to the optical signal. In equation 15, the final output signal v represents a sum of the optical signal and the electrical noise signal, and the probability function p(v) is a convolution of the independent densities of the two signals.

Therefore, expected sources of noise in certain write and read processes may be addressed by altering the variances $\sigma_A^2$ and $\sigma_e^2$ of optical noise and electronic noise. In some embodiments, computed $R(Y_j|X_j)$ values may be stored in a look-up table. In other embodiments, multiple look-up tables could be made, with different computed $R(Y_j|X_j)$ values using different variance values $\sigma_A^2$ and $\sigma_e^2$ in each table, and relevant R definitions may be selected during decoding based on the parameters of the optical storage system. For example, a decoder may select some values based on the optics used to read and/or write the data, the spacing of data bits in the optical disc that is being read, or based on some other parameters of the writing or reading process. Furthermore, in another embodiment, the equations may be stored in the optical storage system, and values may be entered into the equations to compute $R(Y_j|X_j)$ values with different variances $\sigma_A^2$ and $\sigma_e^2$ depending on the specific parameters of the writing or reading process. Computed $R(Y_j|X_j)$ values, or the equations to compute $R(Y_j|X_j)$, may be stored in memory components 38 or 40 of an optical reader system 10, or in any memory registers accessible to the decoder 42. Further, such parameter data may also be stored on the optical disc 12.

Different $\sigma_A^2$ and $\sigma_e^2$ values, and different definitions of $R(Y_j|X_j)$ may impact decoding performance. For example, FIG. 6 depicts a graph 120 comparing the bit error rate 126 of a typical decoding performance assuming white Gaussian noise 122 where the variance parameter 128 was swept to find best performance 122 and a decoding performance using computed noise distribution based on equation (15) 124 for a given simulated electronic and optical noise condition. There is no point on the graph 120 where the conventional Gaussian assumption matches the performance of the methods in accordance with the present techniques.

Assuming a standard Gaussian distribution to address various noise conditions may result in varying accuracy in estimating original source data from the detected output symbols. Further, even the lowest bit error rate of the typical decoding performance assuming Gaussian noise 122 is not as low as the bit error rate of the decoding performance using computed noise variance values 124.

Furthermore, embodiments of the present techniques may have improved decoding efficiency due to the use of the 16-state MAP decoding. Typically, an optical reader system may determine whether a micro-hologram is present at a targeted data bit position by determining whether the light intensity at a detector rises above a threshold value. One example of bit determination based on light intensity thresholds may be found in Gu's study, entitled "Statistics of Both Optical and Electrical Noise in Digital Volume Holographic Data Storage." C. Gu, F. Dai, and J. Hong, *Statistics of Both Optical and Electrical Noise in Digital Volume Holographic Data Storage*, 32 Electronic Letters 1400, 1400-1402 (1996). If the light intensity reading rises above a threshold, this may indicate that a micro-hologram is present at the target position and reflecting the reading beam. If the light intensity reading does not meet the threshold, this may indicate that the reading beam has not been reflected by a micro-hologram at the target position, and no micro-hologram is present at the target position. However, this conventional method may result in reading inaccuracies if, for example, adjacent micro-holograms reflect portions of the reading beam. In this situation, the reflections from adjacent micro-holograms may interfere with the reading of the target position, as a light intensity reading may cross a threshold value even when no microhologram is present at the target position.

The 16-state MAP decoder of the present techniques may achieve a lower bit error rate than a typical decoder using threshold detection. As depicted in the graph 140 of FIG. 7, the 16-state MAP decoding process 144 has a lower bit error rate performance 146 than the typical decoder using threshold detection 142. In the simulation of the two decoding processes 144 and 142, electronic noise was held constant while the optical intensity variance was changed at each data point, producing a range of different optical signal-to-noise ratios (SNR) 148. The encoder used in this example to produce the graph 140 was the 17pp modulator.

As seen in the graphical example in FIG. 7, a comparable error rate between the 16-state MAP decoding of the present techniques and the typical threshold detection decoding may have a difference in SNR by about 1.5 dB. In some embodiments, this improvement may be advantageous in different ways. For example, using the present decoding techniques, an optical reader system 10 may read with an improved word error rate. Alternatively, the optical disc 12 may afford a 10% increase in capacity, as data bits may be spaced more closely together while retaining a certain error rate.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of decoding an optical data signal, comprising:
   receiving an optical data signal; and
   decoding the optical data signal to retrieve source data, wherein decoding the optical data signal comprises estimating source data based on a probability density function parameterized by a computed expected optical noise parameter and a computed expected electronic noise parameter in an optical system.

2. A method of decoding an optical data signal, comprising:
   receiving an optical data signal; and
   decoding the optical data signal to retrieve source data, wherein decoding the optical data signal comprises estimating source data based on a probability density function parameterized by expected optical noise and expected electronic noise in an optical system, wherein the probability density function comprises a convolution of a Ricean or modified Ricean probability density function with a Gaussian density function.

3. The method of claim 1, comprising:
   storing the optical data signal on an optical data disc, wherein storing the optical data signal comprises:
   encoding source data into the optical data signal; and
   writing the optical data signal on the optical data disc.

4. The method of claim 3, wherein encoding the digital source data into the optical data is performed by a 17 Parity Preserve/Prohibit (17pp) encoder.

5. The method of claim 1, wherein receiving the optical data signal comprises receiving the optical data signal from an optical data disc.

6. The method of claim 1, wherein decoding the optical data signal to retrieve source data comprises estimating the source data using a posteriori transition probabilities.

7. The method of claim 6, wherein the source data comprises input bits, and estimating the source data comprises estimating a state of the input bits.

8. The method of claim 7, wherein said estimating the state of the input bits uses a Viterbi algorithm or Bahl, Cocke, Jelinek, and Raviv (BCJR) algorithm.

9. The method of claim 1, further comprising altering the probability density function used for decoding based on optical noise and electronic noise variances.

10. The method of claim 9, wherein the probability density function varies depending on the optical noise and electronic noise variances.

11. The method of claim 1, wherein the probability density function provides one or more probability distributions that are pre-determined and stored in one or more look-up tables accessible to a decoder used to decode the optical data signal.

12. The method of claim 11, wherein the probability distributions selected from the look-up tables are based on the expected optical noise distribution and the electronic noise distribution.

13. The method of claim 11, wherein the one or more probability distributions are stored in an optical data disc comprising the optical data signal.

14. The method of claim 11, wherein equations or algorithms used to process the probability distributions are stored in an optical data disc comprising the optical data signal.

15. The method of claim 1, comprising storing values from the probability density function in one or more of an optical disc comprising the optical data signal, a look-up table, or any memory component accessible to a decoder used to decode the optical data signal.

16. The method of claim 1, comprising storing variance values parameterizing the probability density function in one or more of an optical disc comprising the optical data signal, a look-up table, or any memory component accessible to a decoder used to decode the optical data signal.

17. A system for decoding an optical signal, comprising:
   a detector configured to detect optical returns from an optical data disc;
   a decoder coupled to the detector and configured to estimate source information from the optical returns to produce a decoded signal; and
   a memory component accessible to the decoder, wherein the memory component comprises:
   algorithms to estimate the source information from the optical returns; and
   a look-up table of probability distributions based on a computed expected optical noise parameter and a computed expected electronic noise parameter in the system.

18. A system for decoding an optical signal, comprising:
   a detector configured to detect optical returns from an optical data disc;
   a decoder coupled to the detector and configured to estimate source information from the optical returns to produce a decoded signal; and
   a memory component accessible to the decoder, wherein the memory component comprises:
   algorithms to estimate the source information from the optical returns; and
   a look-up table of probability distributions based on expected optical and expected electronic noise in the system, wherein the probability distributions comprise a convolution of a Ricean or modified Ricean probability density function due to optical detection and a Gaussian probability density function due to electronic noise.

19. The system of claim 17, wherein the algorithms and the look-up table are stored in different memory components accessible to the decoder.

20. The system of claim 17, wherein more than one look-up table of probability distributions are stored in the memory register, and wherein each look-up table comprises probability distributions computed with different noise variance values.

21. The system of claim 17, wherein different noise variances are used to compute the probability distributions in the look-up table based on the computed expected optical noise parameter and the computed expected electronic noise Parameter.

22. The system of claim 17, wherein the memory component is the optical data disc.

23. The system of claim 17, wherein the decoder is further configured to remove any error-correction codes from the decoded signal and correct any errors identified in the decoded signal.

* * * * *